Oct. 16, 1962  W. A. ARMSTRONG  3,058,414
BARBECUE
Filed April 22, 1959
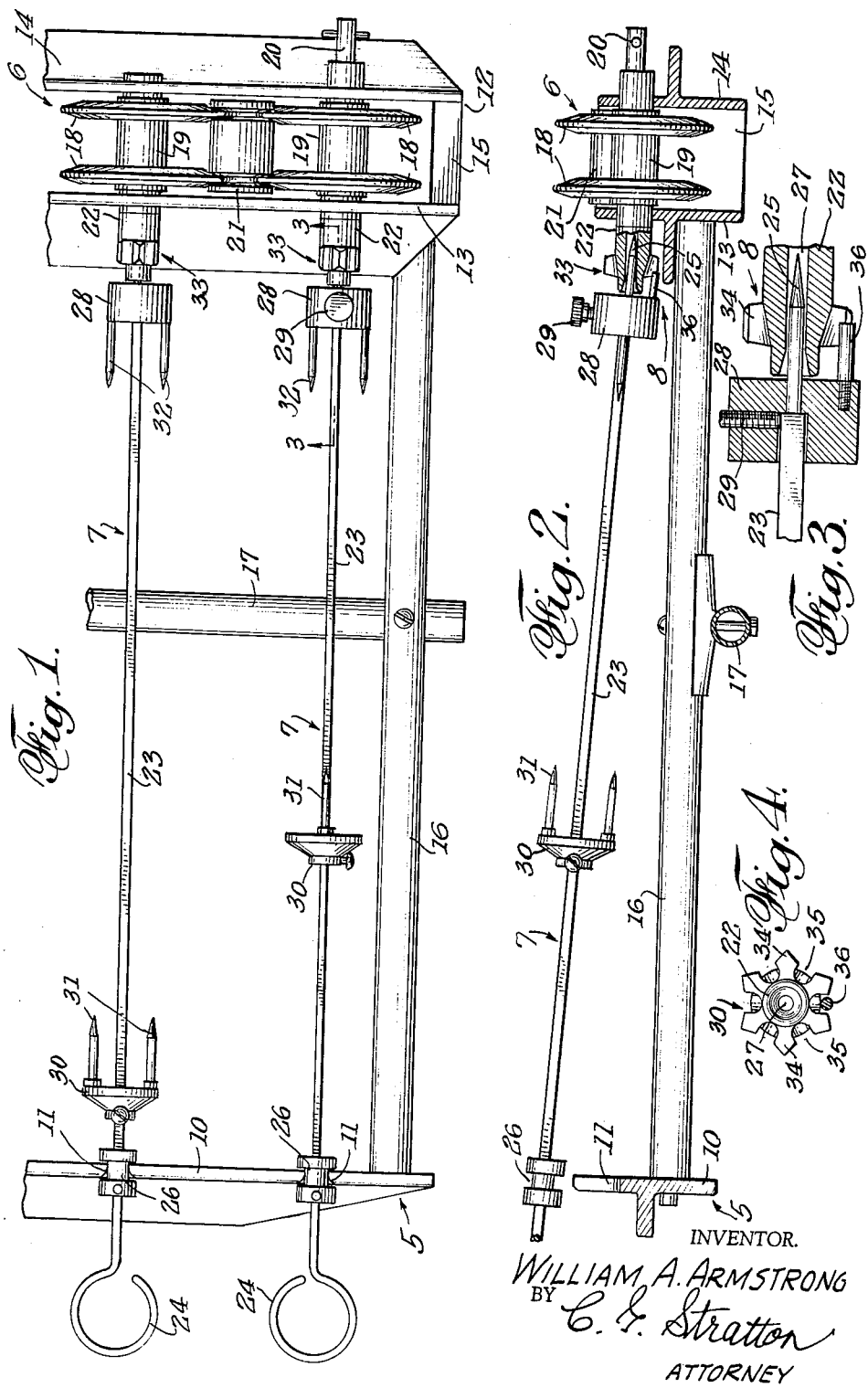
INVENTOR.
WILLIAM A. ARMSTRONG
BY C. F. Stratton
ATTORNEY United States Patent Office 3,058,414
Patented Oct. 16, 1962

3,058,414
BARBECUE
William A. Armstrong, 2634 Via Rivera,
Palos Verdes Estate, Calif.
Filed Apr. 22, 1959, Ser. No. 808,032
3 Claims. (Cl. 99—421)

This invention relates to a barbecue and deals more particularly with the spit construction thereof.

An object of the present invention is to provide a barbecue spit construction that facilitates connection thereof in operative position and is equally easy to remove, thereby greatly aiding the operations of mounting and removing items of food being cooked while on the spit or spits of the construction.

Another object of the invention is to provide a barbecue spit construction that provides for ready separable connection of a spit to driving means provided therefor.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

FIG. 1 is a broken top plan view of a barbecue spit construction embodying the features of the present invention.

FIG. 2 is a longitudinal sectional view showing a spit in the process of being removed or placed in operative position, as the case may be.

FIG. 3 is an enlarged longitudinal sectional view as taken on the line 3—3 of FIG. 1.

FIG. 4 is an end elevational view of a spit-driving element used in the present invention.

The barbecue that is illustrated comprises, generally, a frame 5, drive means 6 at one end of said frame, a plurality of spits 7 disposed in side-by-side relation longitudinally of the frame, and separable means 8 connecting the spits to the drive means.

The frame 5 is shown as having a transverse end member 10 in which is provided a plurality of top-open seats or notches 11 in number according to the number of spits provided in the construction, a housing 12 at the opposite end for the drive means 6 and formed of transverse members 13 and 14 connected by spacer members 15 (only one of which is shown), longitudinal connecting members 16 for the end member 10 and the housing 12, and an intermediate transverse connecting member 17 between the members 16.

The above-described frame 5 may be varied, provided the same has a generally rectangular form in plan and provides supports for opposite ends of the spits 7 used in the construction and drives said spits.

The drive means 6 is shown as having plural sets of drive discs 18, each set being mounted on an arbor 19 and each arbor having bearing in the members 13 and 14 of the housing 12. One of said arbors 19 is preferably connected to a drive motor that is not shown, but is represented by a coupling 20 that extends from said latter arbor beyond the housing 12. Said discs 18 are preferably non-metallic and of a composition that has friction engagement with metal.

It will be clear that the drive of one set of discs 18 may be transmitted to an adjacent set by a transition drive piece 21 that is dropped into place between said adjacent sets of discs and has grooves into which the discs extend. It will be clear from FIG. 1 that the driven lower set of discs 18 drives the upper set of such discs and that additional arbors 19 with discs thereon can be coupled to effect a drive of a plurality of arbors having bearing in the housing members 13 and 14. In this instance, each arbor 19 is provided with an extension 22 that is directed toward the frame member 10 at the opposite end of frame 5. By the described means or any other suitable way, these extensions 22 are rotated.

Each spit 7 comprises an elongated preferably square-sectioned spit member 23 that has one end formed as a handle 24 and the other as a round and pointed bearing or pilot pin 25. The handle end 24 is normally disposed outward of frame member 10 and a spool fitting 26 is secured to the member 23 adjacent said handle in such position that the same may be engaged in a seat 11 when the bearing end 25 is entered into the axial bore 27 of said extension 22 of one of the arbors 19, thus preventing endwise displacement of the spit.

On the end that has the pin 25, the member 23 is provided with a block 28 that, by means of a set screw 29, is removably fastened in place. It will be clear that, with the block 28 removed, an item to be cooked may be impaled on the end 25 and slid onto the member 23 toward the handle 24. An adjustable fork member 30, on the spit member, has pins 31 that enter the cooking item to hold the same against turning relatively to the spit member. Similar pins 32 on the block 28 hold the cooking item when the block is replaced on the spit member.

As may be seen in FIG. 2, regardless of the adjusted position of the member 30, each spit 7 may be upwardly tipped at its handle end and freed from engagement with the frame member so that the pointed pin 25 may be withdrawn from the bore 27 of each respective arbor extension 22, thus enabling removal of the spit so that the block may be removed and the food on the spit removed endwise from the spit member. Placement of food on the spits is as easily accomplished by doing the reverse of what is above described.

The means 8 effects a driving connection between each arbor 19 and the respective spit 7 that has its pin 25 in the bore 27 thereof. Said means 8 comprises a star wheel 33 that is affixed to each extension 22, the same comprising radial arms 34 and in between spaces 35. A pin 36 on each block 28 and directed to enter a space 35, as in FIG. 3, provides a loose-coupled drive that imparts the rotation of the arbor to the spit and yet enables a simple connection and disconnection operation that facilitates quick placement and removal of the spit.

It will be understood that the spit construction may be embodied in a single-spit barbecue, but when used in the plural arrangement shown, there is no interruption of drive of the other spits when one of them has been removed. The only way to stop drive of any arbor and connected spit is to remove the member 21 between two sets of discs 18. Then all spits beyond the discs thus uncoupled will stop rotating.

While the foregoing specification illustrates and describes what I now contemplate to be the best mode of carrying out my invention, the construction is, of course, subject to modification without departing from the spirit and scope of my invention. Therefore, I do not desire to restrict the invention to the particular form of construction illustrated and described, but desire to cover all modifications that may fall within the scope of the appended claims.

Having thus described the invention, what is claimed and desired to be secured by Letters Patent is:

1. A barbecue comprising a support frame, a plurality of tubular arbors mounted on said frame in spaced parallelism at one end of the frame, a spit operatively associated with each arbor and having an end separably entered in the bores of the arbors, the spits extending from said ends to the other end of the support frame, a pair of longitudinally spaced friction drive discs affixed to each arbor on the respective axes of the arbors, the discs of adjacent arbors being transversely aligned and spaced from each other, a freely removable unmounted cylindrical drive member interposed between and frictionally engaging the peripheries of adjacent aligned pairs of discs for transmitting motion therebetween, said cylindrical drive having a diameter larger than the spaces between adjacent aligned discs whereby said cylinder is supported by the discs which frictionally engage the same, a drive extension on one of the arbors, said drive member connecting one arbor to an adjacent arbor through the drive member engaging the same, and drive means connecting each spit and the arbor into which the same is entered.

2. A barbecue according to claim 1 in which annular grooves are provided in each cylindrical drive member, the peripheries of the drive discs that are engaged with the drive members being entered in the grooves of the latter members.

3. A barbecue according to claim 1 in which the other end of the support frame has a plurality of seats in alignment with the mentioned arbors, a spool on each spit rotationally engaged in each respective seat and in engagement with said latter frame end, and is in retaining engagement with the spits to hold the same against endwise displacement relative to the mentioned arbors.

References Cited in the file of this patent

UNITED STATES PATENTS

| | | |
|---|---|---|
| 1,504,608 | Cowin | Aug. 12, 1924 |
| 2,494,448 | Nassif | Jan. 10, 1950 |
| 2,854,918 | Merritt | Oct. 7, 1958 |

FOREIGN PATENTS

| | | |
|---|---|---|
| 748,450 | Great Britain | May 2, 1956 |